S. T. EAST.
AUXILIARY HOOD FOR AUTOMOBILE ENGINES.
APPLICATION FILED JULY 10, 1918.
1,300,936. Patented Apr. 15, 1919.
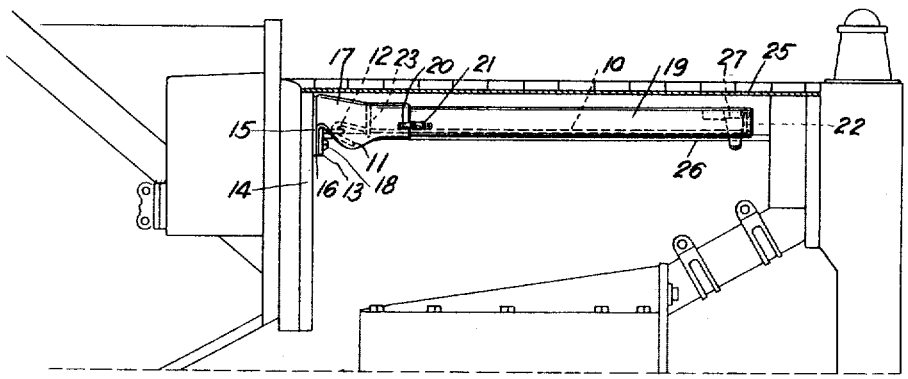
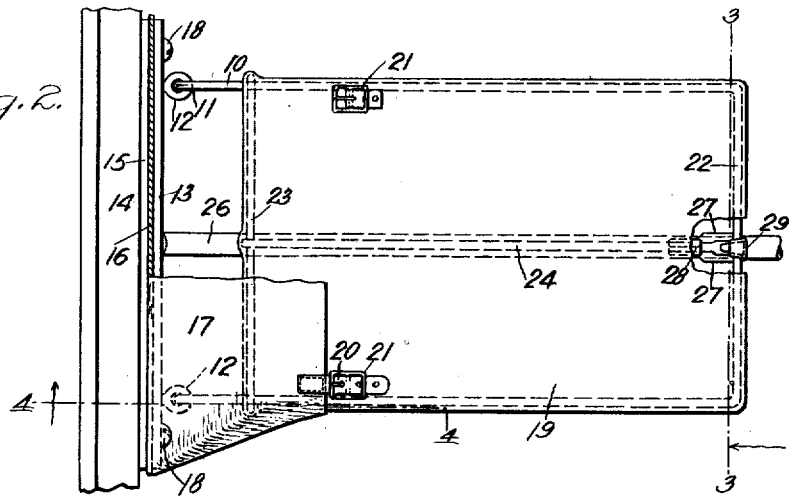
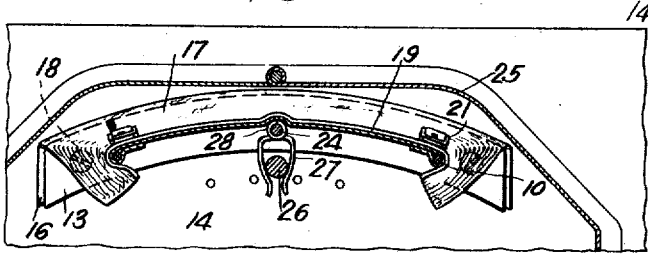
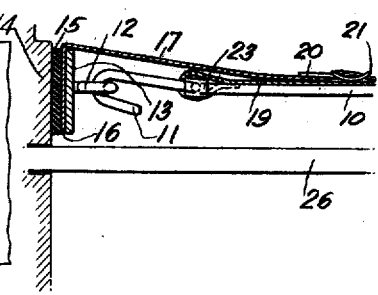
WITNESSES
INVENTOR
S. T. East
BY
ATTORNEYS

UNITED STATES PATENT OFFICE.

SAMUEL T. EAST, OF NORWOOD, LOUISIANA.

AUXILIARY HOOD FOR AUTOMOBILE-ENGINES.

1,300,936.     Specification of Letters Patent.     Patented Apr. 15, 1919.

Application filed July 10, 1918. Serial No. 244,309.

*To all whom it may concern:*

Be it known that I, SAMUEL T. EAST, a citizen of the United States, and a resident of Norwood, in the parish of East Feliciana and State of Louisiana, have invented a new and improved Auxiliary Hood for Automobile-Engines, of which the following is a full, clear, and exact description.

Among the principal objects which the present invention has in view are: to provide means for protecting the engine of an automobile and parts connected therewith from rain and snow; to provide means for retarding the radiation of heat from an automobile engine and parts connected therewith; and to construct and arrange the hood so that the same may be acquired and applied as an accessory.

Drawings.

Figure 1 is a side elevation of an automobile engine and covering hood therefor, and showing in conjunction therewith a rain hood constructed, arranged and installed in accordance with the present invention;

Fig. 2 is a top plan view of a rain hood constructed and arranged in accordance with the present invention, a portion of the hood and of the connecting apron therefor being partially cut away;

Fig. 3 is a cross section, the section being taken as on the line 3—3 in Fig. 2;

Fig. 4 is a longitudinal section, the section being taken as on the line 4—4 in Fig. 2;

Fig. 5 is a detail view in perspective, showing a construction joint clip forming part of the present invention.

Description.

As seen in the drawings, a wire frame 10 is provided at the rear with open hooks 11, which engage eyelets 12 provided in an arch plate 13. As seen best in Fig. 4 of the drawings, the plate 13 is installed in service in fixed relation to the dashboard 14 of an automobile. Between the dashboard and the plate 13, are disposed a gasket 15 and a flap 16 of an apron 17.

The plate 13 and parts connected therewith are secured in position by fastening members 18, as seen best in Fig. 2 of the drawings. The apron 17 is constructed of flexible water-proof material and is long enough to overlie the water-proof fabric cover 19, which is stretched on the frame 10. In service the apron is held in position overlapping the cover 19, by means of straps 20 and buckles 21. The frame 10 is transversely arched to conform with the shape of the usual hook covering the engine of an automobile. The brace rods 22 and 23 are connected by a reinforcing ridge bar 24. The shape of the cover thus formed provides for shedding any water which may pass through the hood 25 of the automobile. (See Fig. 3 of the drawings.)

The rain hood described is arranged to be temporarily removed during such times as repairs are being made to the engine. To this end, the hooks 11 are left open as stated.

In service the hood is held on the tie rod 26 with which automobiles are usually provided, by means of a spring clip 27. The clip 27, as shown in Fig. 5 of the drawings, has a ferrule 28 and a loop 29. The ferrule is provided to encircle the rod 24 at the forward end thereof, while the loop 29 infolds the brace rod 22. The clip thus serves the double purpose of forming a joint between the brace 22 and rod 24, and a temporary attachment for holding the forward end of the hood or cover 19 in service relation.

The hood is extended sufficiently to cover the top of the usual automobile engine to protect the same from rain as well as to shield the electric wiring with which the said engine is usually provided. When desired, the cover 19 may be extended at the edges thereof to form side curtains which may fall down along the sides of the engine and protect the same from radiation of its heat in cold weather.

Claims.

1. A hood as characterized comprising a cover constructed of water-proof fabric; a skeleton frame for holding said fabric in position to shed water which may be deposited on the upper surface thereof; means for installing said cover temporarily in position above an automobile engine and below the usual protective hood therefor, said means embodying hinge members connecting the dashboard of the automobile and rear end of said cover; and a temporary fastening support for the front end of said cover, said support embodying a clip adapted for engaging the structure of the automobile engine equipment.

2. A hood as characterized comprising a cover constructed of water-proof fabric; a skeleton frame for holding said fabric in position to shed water which may be deposited on the upper surface thereof; means for installing said cover temporarily in position above an automobile engine and below the usual protective hood therefor, said means embodying hinge members connecting the dashboard of the automobile and rear end of said cover; and a temporary fastening support for the front end of said cover, said support embodying a clip adapted for engaging the structure of the automobile engine equipment, said clip embodying a closed ferrule and loop for holding the cover structure and open-ended spring gripping members depending therefrom.

3. A hood as characterized comprising a cover constructed of water-proof fabric; a skeleton frame for holding said fabric in position to shed water which may be deposited in the upper surface thereof; means for installing said cover temporarily in position above an automobile engine and below the usual protective hood therefor, said means embodying hinge members connecting the dashboard of the automobile and rear end of said cover; a temporary fastening support for the front end of said cover; and a flexible covering apron adapted to be permanently secured to the dashboard of said automobile and to extend beyond the rear end of said cover to prevent the access of moisture therethrough.

SAMUEL T. EAST.

Witnesses:
F. A. HOWARD,
J. C. CARPENTER.